United States Patent
Yamauchi

(10) Patent No.: US 9,599,120 B2
(45) Date of Patent: Mar. 21, 2017

(54) IMPELLER FOR CENTRIFUGAL PUMP AND CENTRIFUGAL PUMP OF VEHICLE WASHER DEVICE

(71) Applicant: ASMO CO., LTD., Kosai, Shizuoka-pref. (JP)

(72) Inventor: Yuusuke Yamauchi, Hamamatsu (JP)

(73) Assignee: ASMO CO., LTD., Kosai, Shizuoka-pref.

( * ) Notice: Subject to any disclaimer, the term of this patent is extended or adjusted under 35 U.S.C. 154(b) by 648 days.

(21) Appl. No.: 13/968,429

(22) Filed: Aug. 16, 2013

(65) Prior Publication Data

US 2014/0056734 A1 Feb. 27, 2014

(30) Foreign Application Priority Data

Aug. 24, 2012 (JP) ................................. 2012-185223
Jan. 17, 2013 (JP) ................................. 2013-006609

(51) Int. Cl.
*F04D 29/38* (2006.01)
*F04D 25/10* (2006.01)
(Continued)

(52) U.S. Cl.
CPC ............ *F04D 29/22* (2013.01); *F04D 29/24* (2013.01); *B60S 1/48* (2013.01)

(58) Field of Classification Search
CPC ...... F04D 29/22; F04D 29/24; F04D 29/2211; F04D 29/216; F04D 29/384; F01D 5/148
(Continued)

(56) References Cited

U.S. PATENT DOCUMENTS 2,117,011 A * 5/1938 Pratt ...................... F04D 29/22
                                                415/206
2,428,487 A * 10/1947 Fernstrum ................ F04D 9/02
                                                415/56.1
(Continued)

FOREIGN PATENT DOCUMENTS

CN         101201055 A     6/2008
CN         201902364 U     7/2011
(Continued)

OTHER PUBLICATIONS

English language translation of the following: Office action dated Aug. 3, 2016 from the SIPO in a Chinese patent application corresponding to the instant patent application.
(Continued)

*Primary Examiner* — Nicholas J Weiss
*Assistant Examiner* — Ngoc T Nguyen
(74) *Attorney, Agent, or Firm* — SOLARIS Intellectual Property Group, PLLC

(57) ABSTRACT

An impeller for a centrifugal pump comprising a boss supported by a rotation shaft of a motor so as to be rotatable as a unit with the rotation shaft; and a plurality of blades that extend from the boss towards a radial direction outside of the boss, and that discharge liquid towards a leading end side thereof by rotating; wherein each blade comprises one side face that is a face on a first side in a rotation direction of the impeller and includes a projecting face that projects from a base end portion at a boss side of the one side face towards the first side in the rotation direction with respect to a line that connects the base end portion and a center of rotation of the blades.

17 Claims, 9 Drawing Sheets

(51) Int. Cl.
*F04D 29/22* (2006.01)
*F04D 29/24* (2006.01)
*B60S 1/48* (2006.01)

(58) Field of Classification Search
USPC .................. 415/146; 416/243; 361/695, 678
See application file for complete search history.

(56) References Cited

U.S. PATENT DOCUMENTS

| | | | | |
|---|---|---|---|---|
| 2,463,581 | A * | 3/1949 | Welsh | F04D 29/2294 416/241 R |
| 2,884,862 | A * | 5/1959 | Nielsen | F04D 13/02 415/206 |
| 7,896,617 | B1 * | 3/2011 | Morando | F04D 7/065 416/243 |
| 8,348,606 | B2 * | 1/2013 | Gopalan | F04D 29/242 416/243 |
| 2016/0040682 | A1 * | 2/2016 | Walker | F04D 29/24 416/185 |

FOREIGN PATENT DOCUMENTS

| | | | | |
|---|---|---|---|---|
| DE | 2407109 B1 * | 7/1974 | | F04D 29/24 |
| JP | H4-32294 U | 3/1992 | | |
| JP | H08-261195 A | 10/1996 | | |
| JP | H9-88887 A | 3/1997 | | |
| JP | 2004-314792 A | 11/2004 | | |
| JP | 2012-154177 A | 8/2012 | | |
| NL | EP 1903216 A1 * | 3/2008 | | F04D 29/2216 |

OTHER PUBLICATIONS

English language translation of the following: Office action dated Sep. 20, 2016 from the JPO in a Japanese patent application No. 2013-170596 corresponding to the instant patent application.

* cited by examiner

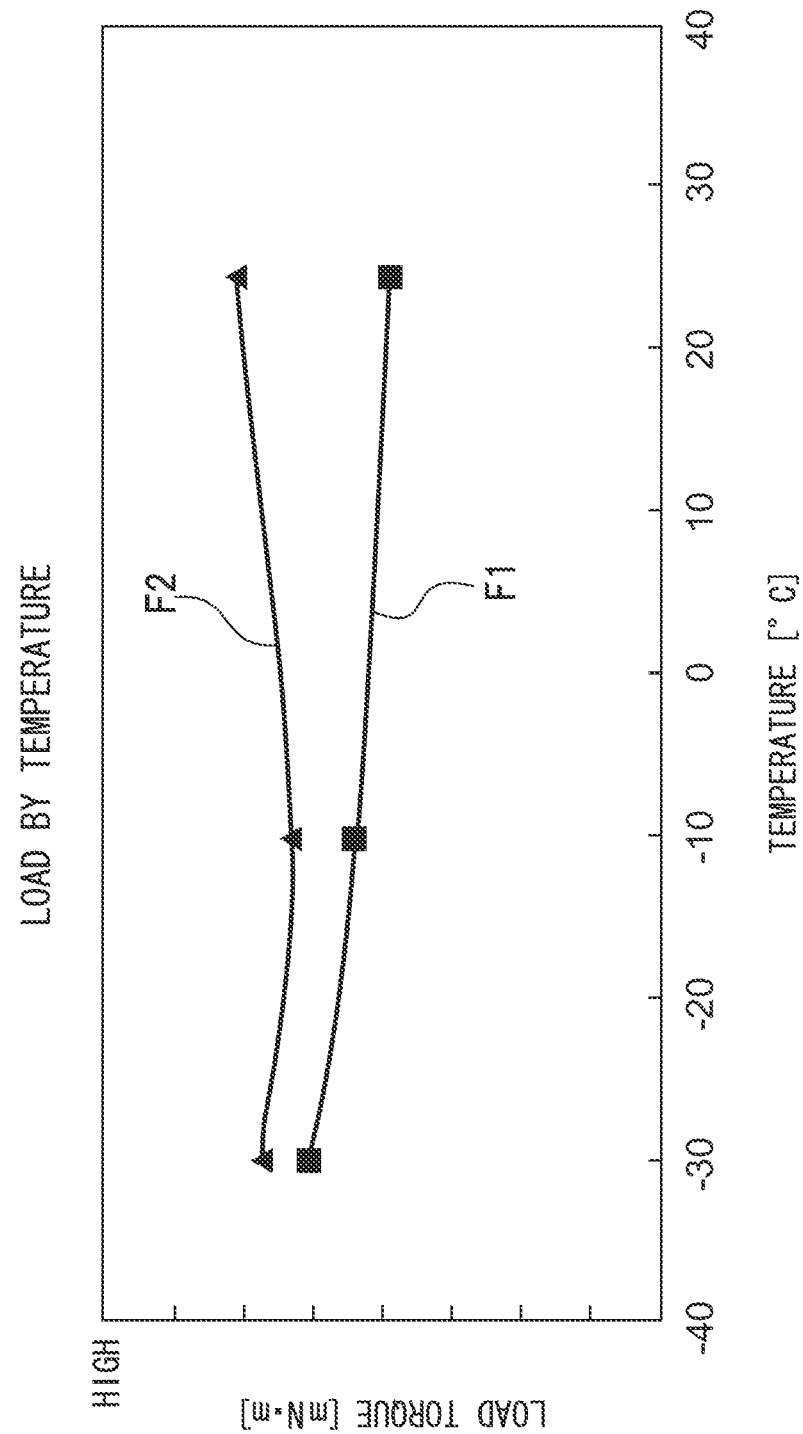

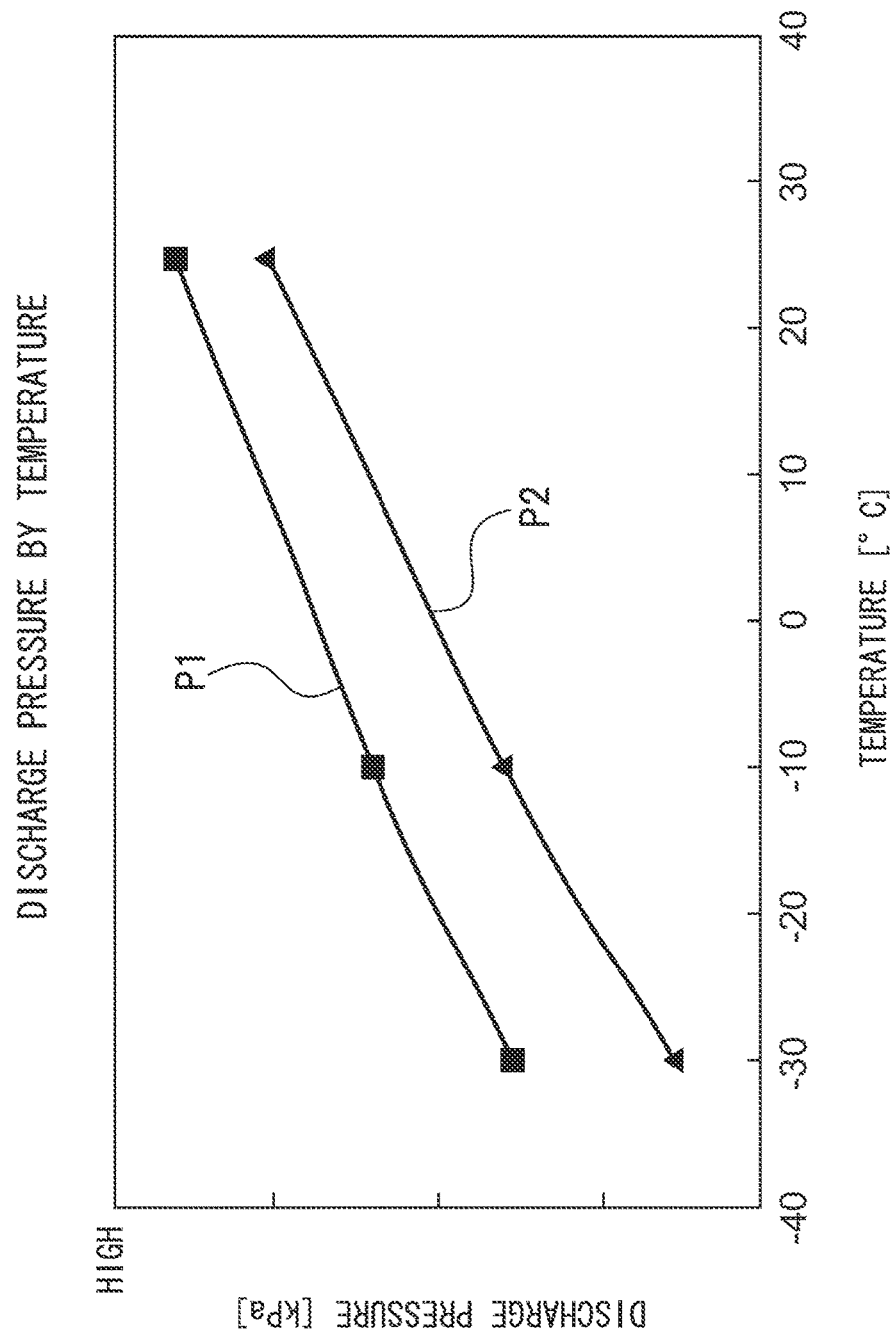

IMPELLER FOR CENTRIFUGAL PUMP AND CENTRIFUGAL PUMP OF VEHICLE WASHER DEVICE

CROSS-REFERENCE TO RELATED APPLICATION

This application claims priority under 35 USC 119 from Japanese Patent Applications No. 2012-185223 filed Aug. 24, 2012 and No. 2013-006609 filed Jan. 17, 2013, the entire disclosures of which are incorporated by reference herein.

BACKGROUND OF THE INVENTION

Field of the Invention

The present invention relates to a impeller for a centrifugal pump and a centrifugal pump provided with the impeller of a vehicle washer device.

Description of the Related Art

Japanese Patent Application Laid-Open (JP-A) No. H08-261195 describes a centrifugal pump wherein an impeller is fixed to a pump shaft, with the pump shaft rotatably supported inside a casing. The impeller is configured including plural blades, with each blade curved from an inlet end towards a radial direction outside and towards a rotation direction rear side. Intermediate blades are formed in a flow path between the blades, thereby maintaining discharge pressure at a uniform pressure, and maintaining pump efficiency.

JP-A No. 2012-154177 describes a vehicle pump device that either squirts cleaning liquid onto a vehicle front windshield and a rear windshield. The vehicle pump device includes a motor section with a motor that rotates an impeller about its axis, and a pump chamber that pressure feeds cleaning liquid when the impeller rotates. A flow path for conveying cleaning liquid towards a front windshield side and a flow path for conveying cleaning liquid to a rear windshield side are connected to the pump chamber. In this vehicle pump device, it is possible to squirt the cleaning liquid either onto the front windshield or onto the rear windshield by switching the rotation direction of the motor.

However, in the vehicle pump device described in JP-A No. 2012-154177, since the same motor squirts the cleaning liquid either onto the front or the rear windshield by switching the rotation direction of the motor, a pressure of the cleaning liquid fed from the pump chamber to the front windshield side and to the rear windshield side are substantially the same pressure.

SUMMARY OF THE INVENTION

However, recently there has been a move away from methanol towards ethanol as the cleaning liquid employed in vehicle washer devices equipped with centrifugal pumps. Namely ethanol that has higher viscosity than methanol is being employed. Since the viscosity of the cleaning liquid increases, for example at low temperatures, there is a possibility of a drop in discharge pressure from the blades (impeller) of the centrifugal pump.

Moreover, there is a recent trend towards setting a smaller angle of inclination for vehicle front windshield (namely of setting a larger slant angle of the front windshield), and also a trend towards employing what are referred to as diffuser nozzles that squirt cleaning liquid onto the front windshield. There is accordingly a concern that when the vehicle is travelling at high speeds in low temperature environment, the landing point of cleaning liquid squirted from the nozzle onto the front windshield may become lower due to a wind caused by vehicle travel.

The cleaning liquid squirted towards the front windshield is more readily affected by airflow associated with vehicle travel than the cleaning liquid squirted towards the rear windshield. There is accordingly a need to squirt the cleaning liquid at high pressure in order to make the cleaning liquid land at a desired position on the front glass. However, there not such a need for high pressure for the squirting pressure of the cleaning liquid towards the rear windshield.

It is conceivable that the viscosity of the cleaning liquid may become more viscous in low temperature environments such as cold regions. In such cases, there is another need to secure squirting of the front windshield in order to remove for example snow melting agents that have adhered to the front windshield. In other words, there is a need to further increase the pressure of the cleaning liquid that is fed from the pump chamber towards the front windshield side in order to squirt the high viscosity cleaning liquid onto the front glass.

When a washer tank that stores the cleaning liquid is disposed inside the engine room (generally disposed at a front section of a vehicle body), a length of a pipe from the washer tank to the rear windshield is longer than a length of a pipe from the washer tank to the front windshield. It is accordingly conceivable that connection portions of a pipe provided between the washer tank and the rear windshield may come apart when an internal pressure of the pipe increases in the event that a kink may occur partway along the pipe and the cleaning liquid flowing inside the pipe is retained. In other words, it is preferable for the internal pressure of a pipe between the washer tank and the rear windshield to be of low enough pressure such that connection portions do not come apart.

In consideration of the above circumstances, the present invention provides an impeller for a centrifugal pump and a centrifugal pump equipped in a vehicle washer device that are capable of suppressing a drop in discharge pressure at low temperatures.

The present invention moreover provides a centrifugal pump capable of achieving high pressure for cleaning liquid that is pressure fed from the pump chamber to the front windshield side, and low pressure for cleaning liquid that is pressure fed from the pump chamber to the rear windshield side.

An impeller for a centrifugal pump of an aspect of the present invention includes: a boss that is supported by a rotation shaft of a motor so as to be rotatable as a unit with the rotation shaft; plural blades that extend from the boss towards a radial direction outside of the boss, and that discharge liquid towards a leading end side thereof by rotating. Each of the blades comprises one side face that is a face on a first side in a rotation direction of the impeller and includes a projecting face that projects from a base end portion at a boss side of the one side face towards the first side in the rotation direction with respect to a line that connects the base end portion and a center of rotation of the blades.

According to the impeller of above aspect, the boss and the blades are integrally formed, with the blades extending from the boss towards the boss radial direction outside. The boss is supported by the rotation shaft of the motor so as to be rotatable as a unit with the rotation shaft, such that liquid between the blades is discharged from a base end portion side (inlet side) of the blades towards a leading end side (outlet side) of the blades due to the blades rotating.

A face in the first rotation direction side is the one side face. The one side face includes the projecting face, and the projecting face projects from the base end portion at a boss side towards the first side in the rotation direction with respect to a line that connects the base end portion and the center of rotation of the blades. It is accordingly possible to make an angle (inflow angle) formed between a blade rotation speed (circumferential speed) vector and an absolute speed vector of the liquid on the base end portion side (inlet side) of the one side face to be small. The absolute speed vector is a compound vector formed with relative speed vector in the flow direction of the liquid with respect to each blade and the blade rotation speed vector. Angular momentum can accordingly be increased at the base end side (inlet side) of the blades.

Load torque acting on the impeller is a difference between the angular momentum on the leading end side (outlet side) and the angular momentum on the base end side (inlet side) of the blades. Accordingly, by increasing the angular momentum at the base end side (inlet side) of the blades, the load torque acting on the impeller decreases. As a result, a drop in the rotation speed of the blades can be suppressed even when for example the viscosity of the liquid increases at low temperature environments.

A discharge pressure by the impeller is proportional to the square of the rotation speed of the blade. Accordingly, a drop in the discharge pressure of the impeller can be suppressed due to suppressing a drop in a rotation speed of the blades at low temperature environments.

A centrifugal pump of a vehicle washer device of an aspect of the present invention includes: a motor housed in a motor housing portion of a pump body; and the impeller for a centrifugal pump of any one of the first to the ninth aspects which is housed in a pump chamber of the pump body with the pump chamber in communication with inside of a washer tank, which is supported on a rotation shaft of the motor so as to be rotatable as a unit with the rotation shaft, and which by rotation, discharges liquid inside the washer tank towards an outlet of the pump body.

According to the centrifugal pump of the vehicle washer device of above aspect, the motor is housed in the motor housing portion of the pump body. The impeller is housed in the pump chamber of the pump body, and is supported on the rotation shaft of the motor so as to be capable of rotating as a unit with the rotation shaft. The liquid (cleaning liquid) inside the washer tank is discharged to the outlet of the pump body when the impeller rotates. A drop in the discharge pressure of the impeller can accordingly be suppressed even when the viscosity of the liquid inside the washer tank increases at low temperatures, thereby enabling excellent discharge of the liquid towards the outlet side.

BRIEF DESCRIPTION OF THE DRAWINGS

Embodiments of the invention will be described in detail with reference to the following figures, wherein:

FIG. 8A is a graph schematically illustrating rotation load characteristics of an impeller; and FIG. 8B is a graph schematically illustrating fluid discharge pressure from a pump chamber.

DETAILED DESCRIPTION OF THE INVENTION

Explanation follows regarding a centrifugal pump (washer pump) 12 of a vehicle washer device 10 according to a present exemplary embodiment. Explanation then follows regarding an impeller 80 for a centrifugal pump (referred to below as the impeller) employed in the centrifugal pump 12.

Regarding the Centrifugal Pump 12

Figure 2:
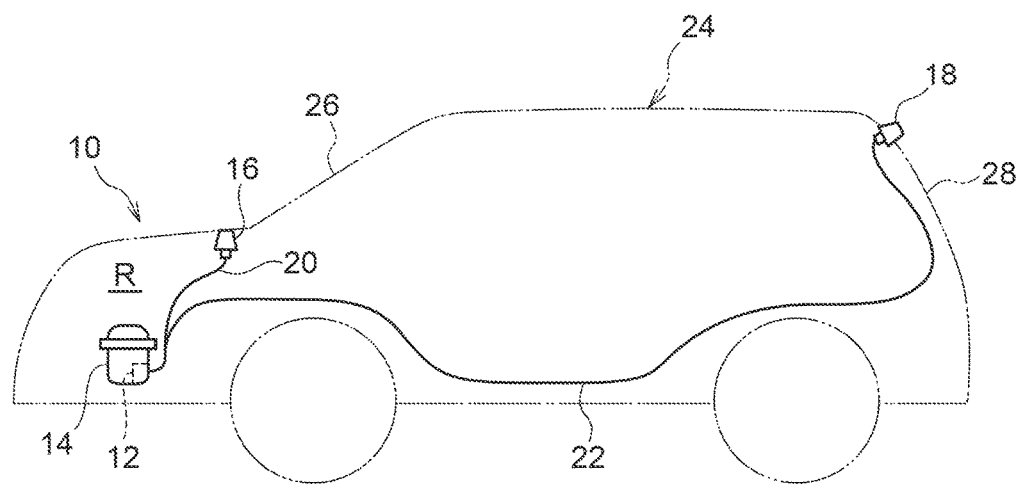
FIG. 2 is a schematic view illustrating an overall configuration of a vehicle washer device employing the impeller illustrated in FIG. 1.

As illustrated in FIG. 2, the vehicle washer device 10 is applied to a vehicle 24. The vehicle washer device 10 is provided with a washer tank 14 disposed inside an engine room R of the vehicle 24. The centrifugal pump 12 is assembled to the washer tank 14 such that an up-down direction of the centrifugal pump 12 is the same direction as an up-down direction of the vehicle 24. The vehicle washer device 10 also includes a front nozzle 16 for washing a front windshield 26 of the vehicle 24, and a rear nozzle 18 for washing a rear windshield 28 of the vehicle 24. The front nozzle 16 and the rear nozzle 18 are respectively connected to the centrifugal pump 12 through hoses 20, 22.

Figure 3:
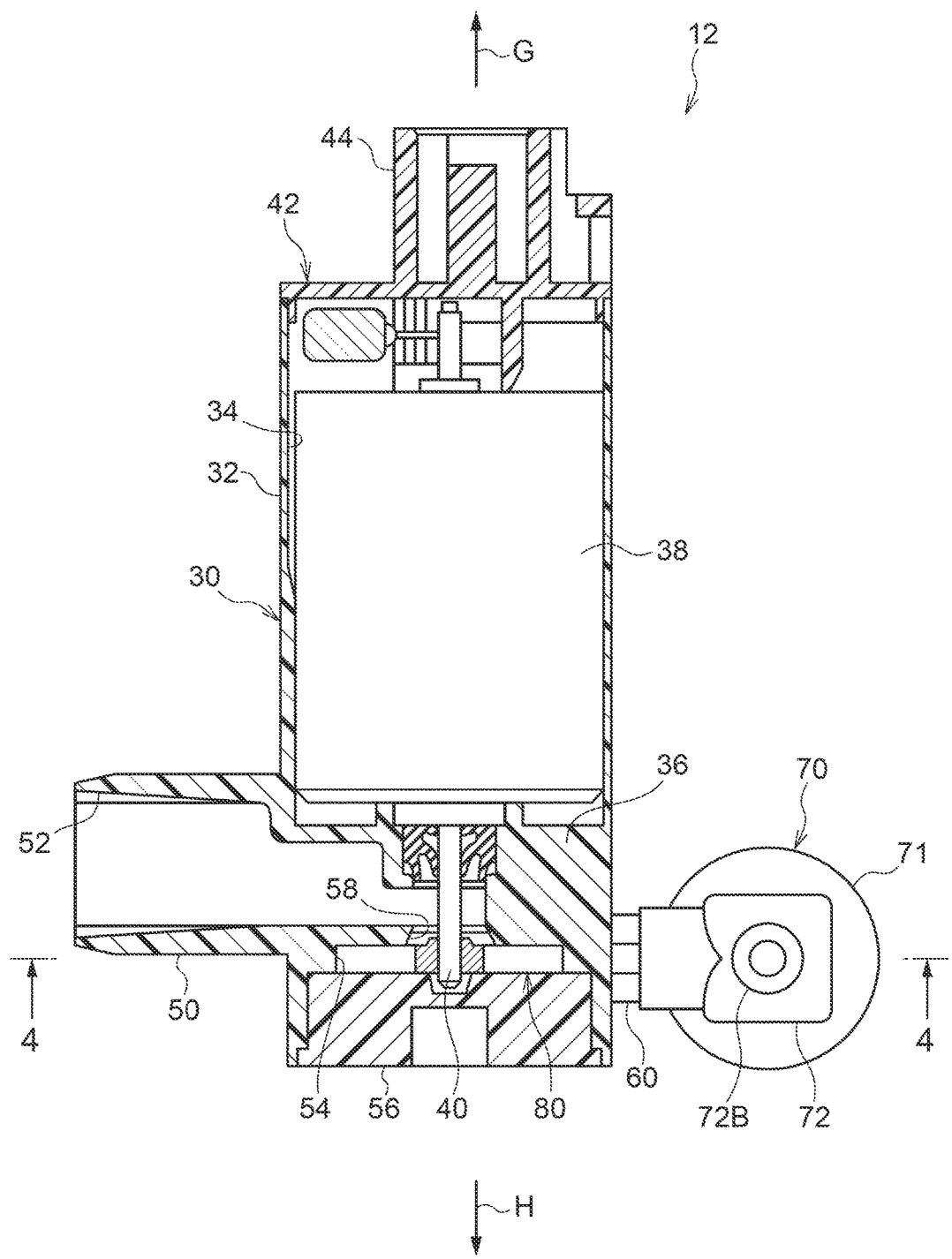
FIG. 3 is a side cross-section illustrating a centrifugal pump applied with the impeller illustrated in FIG. 1.

As illustrated in FIG. 3, the centrifugal pump 12 is configured including a pump body 30 and a valve device 70. The pump body 30 is configured including a housing 32, a motor 38, and the impeller 80.

The housing 32 is configured from resin and is formed in a substantially circular cylinder shape with an axial direction of a rotation shaft 40 of the motor 38 oriented in the up-down direction (see arrow G and arrow H in FIG. 3). The housing 32 is configured including a motor housing portion 34, an inlet 50, a pump chamber 54, a first outlet 60 serving as an outlet, and a second outlet 62 serving as an outlet (see FIG. 4). The motor housing portion 34 configures an upper side portion of the housing 32 (the portion on the arrow G direction side in FIG. 3), and is formed in a bottomed substantially circular cylinder shape that is open towards an upper side. A bottom wall portion of the motor housing portion 34 configures a partitioning wall 36, and an inside of the motor housing portion 34 and an inside of the inlet 50, described later, are partitioned by the partitioning wall 36. The motor 38 is housed inside the motor housing portion 34, with the rotation shaft 40 of the motor 38 passing through the partitioning wall 36 and projecting out from the partitioning wall 36 towards the lower side. A leading end portion of the rotation shaft 40 of the motor 38 is formed with a D shaped cross-section profile. Note that a seal member is disposed at a shaft hole portion of the partitioning wall 36 through which the rotation shaft 40 passes, thereby preventing cleaning liquid from entering inside the motor housing portion 34 from the pump chamber 54 side.

A connector cap 42 is fixed in an opening portion of the motor housing portion 34, thereby closing off the motor housing portion 34 opening portion. A connector portion 44 is integrally formed to the connector cap 42, and current is supplied to the motor 38 by connecting the connector portion 44 to a vehicle 24 side external connector (not illustrated in the drawings).

The inlet 50 is disposed to the lower side of the motor housing portion 34. The inlet 50 is formed in a substantially circular cylinder shape, and is disposed with its axial direction in a direction orthogonal to the rotation shaft 40 of the motor 38 so as to project out towards outside in a radial direction of the housing 32. A space inside the inlet 50 configures an inlet hole 52, and the inlet hole 52 extends as far as the lower side of the motor housing portion 34. The housing 32 is assembled to the washer tank 14 in a state that the inlet 50 is inserted inside the washer tank 14.

The pump chamber 54 is disposed at a lower side of the inlet 50 at a lower end portion of the housing 32, and is open towards the lower side. A cap 56 is fixed to an opening portion at the lower end portion of the housing 32, the cap 56 thereby closing off the pump chamber 54. A communication hole 58 is formed between the pump chamber 54 and the inlet hole 52 of the inlet 50. The communication hole 58 is disposed coaxially to the rotation shaft 40 of the motor 38, is configured with a circular shape, and places an inside of the pump chamber 54 in communication with the inside of the inlet 50 (inlet hole 52) at a central portion of the pump chamber 54. The rotation shaft 40 of the motor 38 extends through the inside of the inlet 50 and the communication hole 58 as far as the pump chamber 54, with a leading end portion of the rotation shaft 40 disposed inside the pump chamber 54. The impeller 80, described later, is housed inside the pump chamber 54, with the impeller 80 assembled to the leading end portion of the rotation shaft 40 so as to be rotatable together as a unit with the rotation shaft 40.

Figure 4:
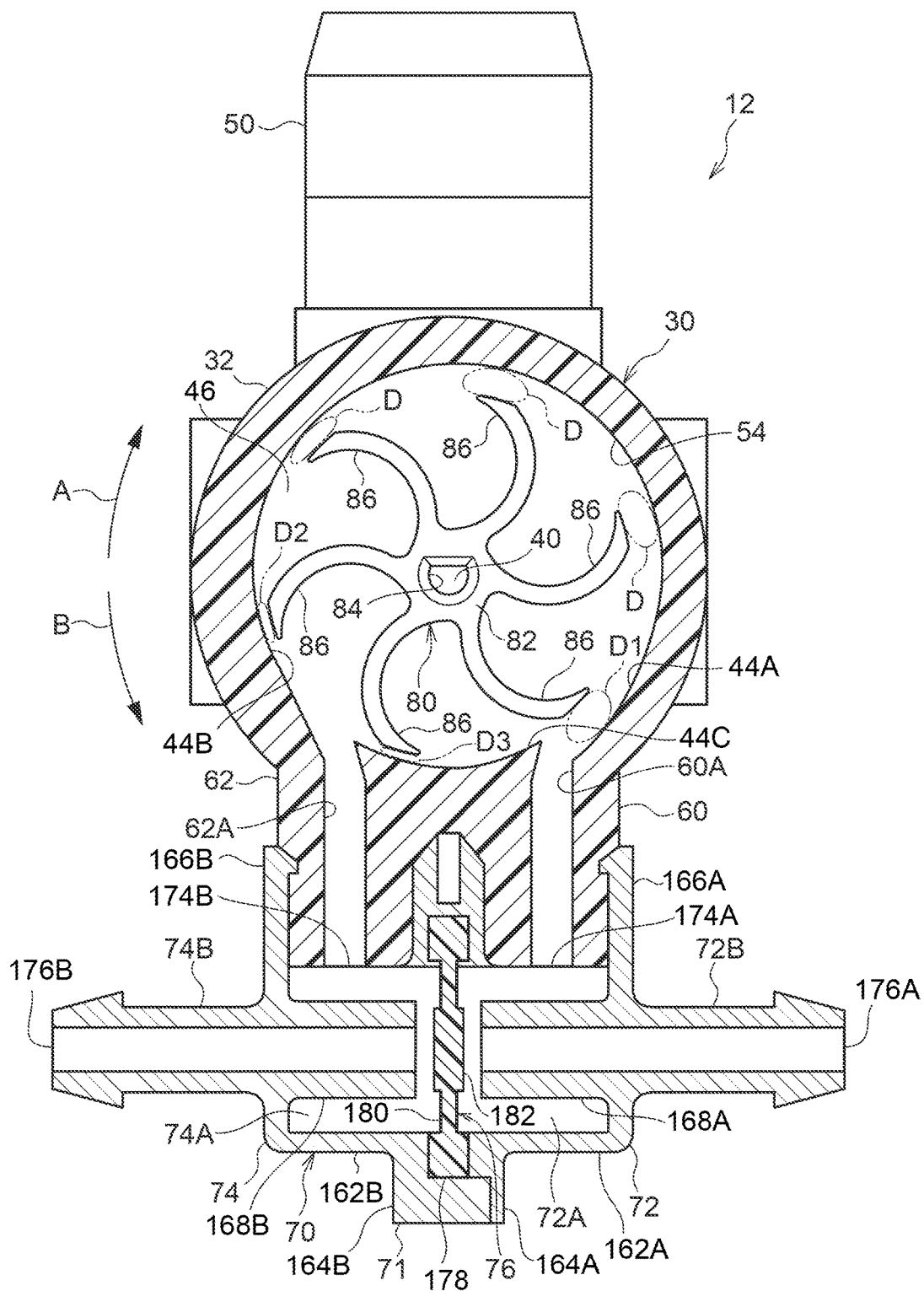
FIG. 4 is a cross-section illustrating a pump chamber of housing that is illustrated in FIG. 3 as viewed from a rotation axis lower side (a cross-section taken on line 4-4 of FIG. 3)

As illustrated in FIG. 4, a first outlet 60 and a second outlet 62 are disposed at the lower end portion of the housing 32. The first outlet 60 and the second outlet 62 are respectively formed in substantially circular cylinder shapes and are disposed parallel to one another, projecting out from the lower end portion of the housing 32 on the opposite side to the inlet 50 towards the radial direction outside. Inside the first outlet 60 and the second outlet 62, a first discharge path 60A and a second discharge path 62A are in communication with the inside of the pump chamber 54.

Moreover, the pump chamber 54 includes a volute 46 in which a separation D1 between an inner peripheral wall 44A at a first outlet 60 side of the pump chamber 54 and the impeller 80 is set wider than a separation D2 between an inner peripheral wall 44B at a second outlet 62 side of the pump chamber 54 and the impeller 80. The volute 46 is formed such that the separation between the inner peripheral walls 44A, 44B of the pump chamber 54 and the impeller 80 becomes progressively wider around the vortex direction (the arrow A direction) of the volute 46. Moreover, a separation D3 between a location 44C between the first outlet 60 and the second outlet 62 of the inner peripheral wall of the pump chamber 54 and the impeller 80 is set narrower than the separation D2 between the inner peripheral wall 44B on the second outlet 62 side and the impeller 80.

Valve Device 70

As illustrated in FIG. 4, the valve device 70 includes a valve housing 71 fitted onto the first outlet 60 and the second outlet 62. The valve housing 71 is configured including a first housing segment 72 and a second housing segment 74.

A valve body 76 configured from a resilient member such as a rubber material is assembled between the first housing segment 72 and the second housing segment 74. A first valve chamber 72A and a second valve chamber 74A are respectively configured inside the first housing segment 72 and the second housing segment 74. The first valve chamber 72A and the second valve chamber 74A are partitioned by the valve body 76. The first valve chamber 72A and the second valve chamber 74A are respectively in communication with the first discharge path 60A and the second discharge path 62A.

A first discharge portion 72B and a second discharge portion 74B, each of substantially circular cylinder shape, are respectively integrally formed to side walls of the first housing segment 72 and the second housing segment 74. The first discharge portion 72B and the second discharge portion 74B are coaxial to each other and respectively project from the side walls of the first housing segment 72 and the second housing segment 74 out in directions heading away from each other. The first discharge portion 72B and the second discharge portion 74B respectively stick out from these side walls so as to penetrate into the first valve chamber 72A and the second valve chamber 74A as far as locations in front of the valve body 76, facing the valve body 76. Although omitted from illustration in the drawings, the front nozzle 16 described above is connected to the first discharge portion 72B through the hose 20, and the rear nozzle 18 is connected to the second discharge portion 74B through the hose 22.

Detailed explanation follows regarding the valve device 70. The first and second housing segments 72, 74 respectively include main body portions 162A, 162B, outer extension portions 164A, 164B, first and second inflow cylinder portions 166A, 166B serving as first and second inlets, first and second inner extension cylinder portions 168A, 168B, and the first and second discharge portions 72B, 74B.

The main body portions 162A, 162B are formed in bottomed substantially circular cylinder shapes, with inner portions thereof forming the first and second valve chambers 72A, 74A. The outer extension portions 164A, 164B extend from opening side peripheral edge portions of the main body portions 162A, 162B towards the radial direction outsides, and fitting portions, not shown in the drawings, of the outer extension portions 164A, 164B are fitted and fixed together, thereby assembling together the first and second housing segments 72, 74.

The first and second inflow cylinder portions 166A, 166B are formed projecting towards the radial direction outside from a further bottom portion side than the outer extension portions 164A, 164B of the main body portions 162A, 162B. The first and second inflow cylinder portions 166A, 166B are moreover fitted over the first and second outlets 60, 62, thereby fixing the valve device 70 onto the pump body 30. First and second inflow ports 174A, 174B that are connected to respective outlet ports of the first and second outlets 60, 62 are open at outer peripheral portions of the main body portions 162A, 162B.

The first and second inner extension cylinder portions 168A, 168B are formed projecting from central parts of bottom portions of the main body portions 162A, 162B towards insides of the main body portions 162A, 162B. The first and second discharge portions 72B, 74B are formed projecting from the central parts of bottom portions of the main body portions 162A, 162B to the outsides of the main body portions 162A, 162B. The first inner extension cylinder portion 168A and the first discharge portion 72B, and the second inner extension cylinder portion 168B and the second discharge portion 74B are respectively formed so as to be coaxial to each other. The first inner extension cylinder portion 168A and the second inner extension cylinder portion 168B are moreover formed coaxially to each other and leading end portions thereof are separated from so as to face to each other. The leading end side openings of the first and second discharge portions 72B, 74B are formed with first and second discharge openings 176A, 176B.

The valve body 76 is formed from a resilient material such as rubber, and is formed in a substantially circular disk shape. The valve body 76 is integrally provided with: a ring shaped outer peripheral edge portion 178; a ring shaped thin portion 180 that is formed to an inside of the outer peripheral edge portion 178 and that is thinner than the outer peripheral edge portion 178, and a circular disk shaped valve main body portion 182 that is formed inside the thin portion 180 and that is thicker than the thin portion 180.

The outer peripheral edge portion 178 of the valve body 76 is gripped by the outer extension portions 164A, 164B, thereby assembling the valve body 76 to the first and second housing segments 72, 74. In the assembled state of the valve body 76 to the first and second housing segments 72, 74, the first valve chamber 72A and the second valve chamber 74A are partitioned by the valve body 76. The valve main body portion 182 is disposed between the leading end portion of the first inner extension cylinder portion 168A and the leading end portion of the second inner extension cylinder portion 168B. The valve main body portion 182 is resiliently supported by the thin portion 180 so as to be capable of making contact with the leading end portions of the first inner extension cylinder portion 168A and the second inner extension cylinder portion 168B.

When the impeller 80 rotates towards the first side in the rotation direction (the vortex direction; the arrow A direction side indicated for example in FIG. 4), the valve body 76 is pushed towards a second discharge portion 74B side due to a pressure difference between the inside of the first valve chamber 72A and the second valve chamber 74A, thereby closing off the second discharge portion 74B. Cleaning liquid inside the washer tank 14 is accordingly pressure fed through the first discharge portion 72B towards the front nozzle 16. However, when the impeller 80 rotates towards the second side in the rotation direction (the opposite direction to the vortex direction; the arrow B direction side indicated for example in FIG. 4), the valve body 76 is pushed towards the first discharge portion 72B side due to a pressure difference between the inside of the first valve chamber 72A and the second valve chamber 74A, thereby closing off the first discharge portion 72B. Cleaning liquid inside the washer tank 14 is accordingly pressure fed through the second discharge portion 74B towards the rear nozzle 18. Note that in FIG. 4, hatching of the impeller 80 has been omitted.

Regarding the Impeller 80

Figure 1:
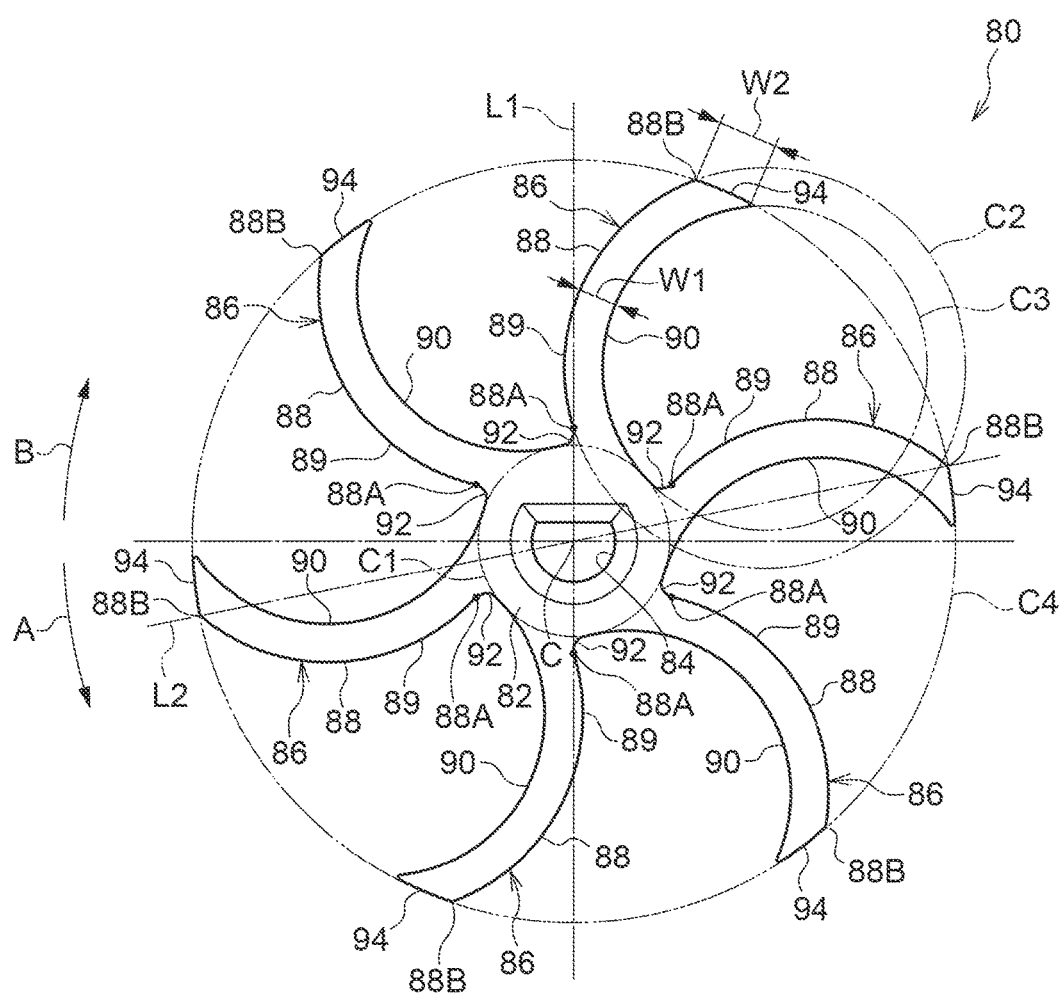
FIG. 1 is a plan view illustrating an impeller for a centrifugal pump of an exemplary embodiment as viewed from a rotation axis upper side.
Figure 5:
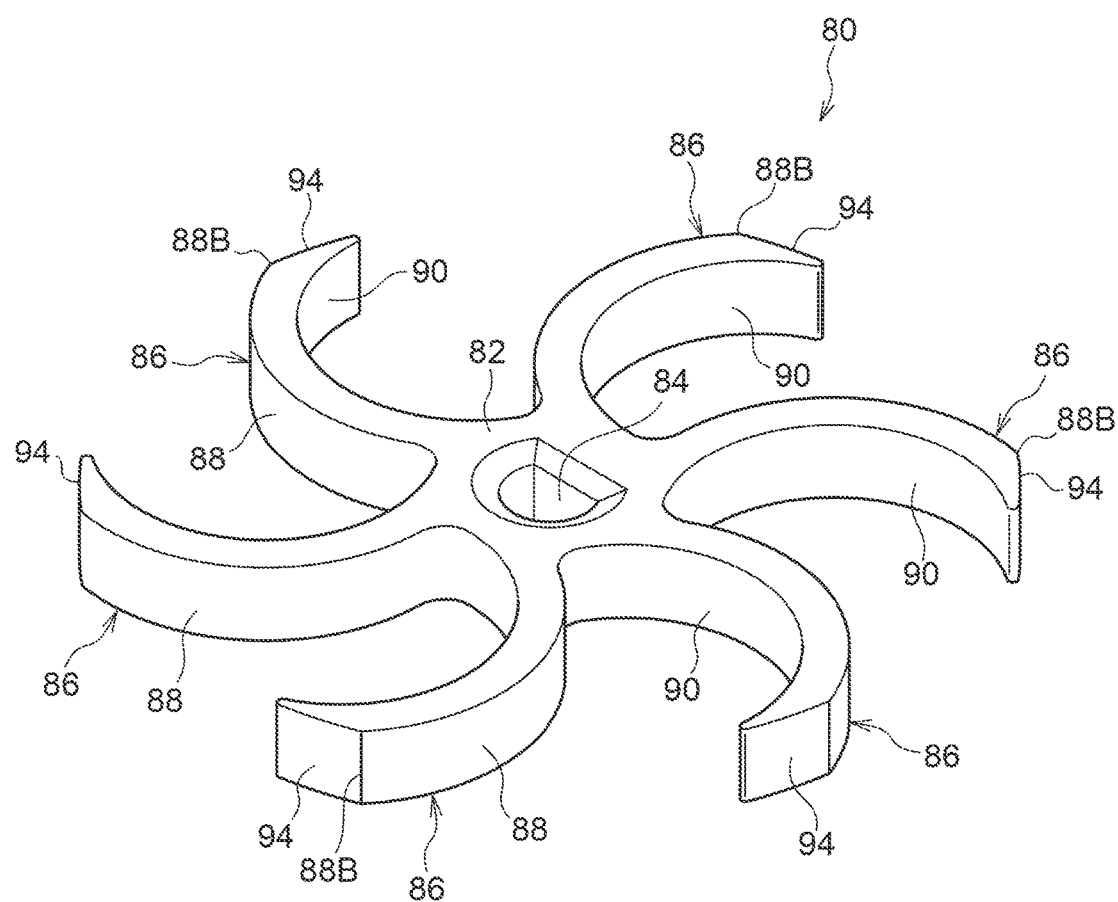
FIG. 5 is a perspective view illustrating the impeller illustrated in FIG. 1.

The impeller 80 is configured from resin and is disposed inside the pump chamber 54 of the housing 32. As illustrated in FIG. 1 and FIG. 5, the impeller 80 is configured including a boss 82 (the portion inside a hypothetical circle C1) that is assembled to the rotation shaft 40 of the motor 38, and plural (six in the present exemplary embodiment) blades 86 that discharge cleaning liquid inside the pump chamber 54 towards the first outlet 60 side and the second outlet 62 side.

The boss 82 is positioned at a central portion of the impeller 80, and is formed in a substantially circular cylinder shape (the double-dotted dashed line in FIG. 1). A diameter of an outer peripheral portion of the boss 82 indicated by the hypothetical circle C1 is smaller than that of the diameter of the opening of the communication hole 58. An assembly hole 84 of substantially D shaped profile corresponding to the rotation shaft 40 of the motor 38 is formed through a central portion of the boss 82. The rotation shaft 40 is inserted into the assembly hole 84. Configuration is thus such that the boss 82 is disposed substantially directly beneath the communication hole 58, with the impeller 80 configured so as to rotate as a unit with the rotation shaft 40. Note that the impeller 80 rotates as a unit with the rotation shaft 40, however is also capable of moving in an axial direction of the rotation shaft 40.

The blades 86 are integrally formed to an outer peripheral face of the boss 82, and are disposed extending from the boss 82 towards outside in a radial direction of the boss 82. Accordingly, configuration is made such that by rotating the impeller 80, cleaning liquid in the washer tank 14 is made to flow in through the communication hole 58 at a base side (inlet side) of the blades 86, and is discharged out towards leading end sides (outlet side) of the blades 86.

The blades 86 are each configured including a one side face 88 configuring a face on the first side in the rotation direction of the blade 86, and another side face 90 configuring a face on the second side in the rotation direction of the blade 86. As illustrated in FIG. 1, as viewed along the axial direction of the rotation shaft (rotation shaft 40) of the impeller 80, the one side face 88 is configured by a curved face of a single circular arc, forming a projection towards the first side in the rotation direction. A base portion 88A, that is a boss side base end portion of the one side face 88, and the boss 82 are connected by a circular arc shaped connecting face 92 that forms an arc projecting in the opposite direction to the one side face 88 as viewed along the rotation shaft 40 axial direction. Specifically, the hypothetical circle C1 shown by the double-dotted dashed line in FIG. 1 indicates the external profile of the boss 82. One end of the connecting face 92 is connected to the outside of the hypothetical circle C1, and the other end of the connecting face 92 is connected to the base portion 88A of the one side face 88. The base portion 88A of the one side face 88 is therefore an intersection point between the one side face 88 and the connecting face 92. With respect to a reference line L1 that runs through the center of rotation C of the impeller 80 and the base portion 88A of the one side face 88, the one side face 88 moreover extends from the base portion 88A so as to bulge towards the first side in the rotation direction at first, and intersects with the reference line L1, such that a leading end 88B of the one side face 88 is disposed on the second side in the rotation direction of the reference line L1. The projected portion of the one side face 88 that bulges out with respect to the reference line L1 towards the first side in the rotation direction from the base portion 88A accordingly configures a projecting face 89. Note that a radius of the circular arc of the connecting face 92 is set smaller than a radius of the circular arc of the one side face 88 (set at about ⅕ in the present exemplary embodiment).

The other side face 90 is configured as viewed along the rotation shaft 40 axial direction by a curved face of a single circular arc that is open towards the second side in the rotation direction. A hypothetical circle C3 that coincides with the other side face 90 is formed so as to be concentric with a hypothetical circle C2 that coincides with the one side face 88. A width dimension W1 at an intermediate portions in an extension direction of the blade 86 (portions excluding the base portion and the leading end portion of the blade 86) is accordingly set so as to be uniform along the blade 86 extension direction.

As viewed along the rotation shaft 40 axial direction, the hypothetical circle C3 that coincides with the other side face 90 contacts to the hypothetical circle C1 of the external shape of the boss 82. Moreover, the connecting face 92 contacts the hypothetical circle C3 at a contact point of the hypothetical circle C3 and the hypothetical circle C1. Namely, the other side faces 90 and the one side faces 88 of each of the adjacent blades 86 are connected smoothly by the connecting face 92 at the boss 82. More specifically, in mutually adjacent blades 86, the other side face 90 of one blade 86 and the one side face 88 of the other blade 86 are connected smoothly by the connecting face 92 at the outer peripheral portion of the boss 82 between the two blades 86.

Moreover, an outer peripheral face 94 at a leading end portion of the blade 86 coincides with a portion of a hypothetical circle C4 that is centered on a rotation center C of the impeller 80. Accordingly, a width dimension W2 of the blade 86 at the outer peripheral face 94 is set larger than a width dimension W1 at intermediate portions in an extension direction of the blade 86.

The blades 86 are moreover disposed at a specific interval (every 60° in the present exemplary embodiment) around the impeller 80 rotation direction. Three groups of the blades 86 are formed, with one group including a pair of the blades 86 that oppose each other across the rotation center C of the impeller 80. In each of the opposing pairs of the blades 86, the one side faces 88 are disposed entirely so as to bulge out (project) towards the first side in the rotation direction with respect to a line L2 joining together the leading ends 88B of the one side faces 88. The impeller 80 is moreover formed so as to have a uniform cross-section profile along an impeller 80 thickness direction (the rotation shaft 40 axial direction) (see FIG. 5).

Explanation follows regarding operation and advantageous effects of the present exemplary embodiment.

In the centrifugal pump 12 of the vehicle washer device 10 configured as described above, when the impeller 80 rotates towards the first side in the rotation direction side (A direction), cleaning liquid is drawn from the inlet 50, through the communication hole 58, and into the central portion of the pump chamber 54. The cleaning liquid inside the pump chamber 54 is discharged from the base side of the blades 86 of the impeller 80 (inlet side) towards the leading end side of the blades 86 (outlet side), and made to flow out to the valve device 70 from the first discharge path 60A of the first outlet 60. The cleaning liquid is pressure fed through the first discharge portion 72B of the valve device 70 and the hose 20 to the front nozzle 16, and is squirted towards the front windshield 26 from the front nozzle 16.

However, when the impeller 80 rotates towards the second side in the rotation direction (B direction), cleaning liquid is drawn from the inlet 50 and through the communication hole 58 into the central portion of the pump chamber 54. The cleaning liquid inside the pump chamber 54 is discharged from the base side (inlet side) of the blades 86 towards the leading end side (outlet side) of the blades 86, and made to flow out to the valve device 70 from the second discharge path 62A of the second outlet 62. The cleaning liquid is pressure fed through the second discharge portion 74B of the valve device 70 and the hose 22 to the rear nozzle 18, and is squirted towards the rear windshield 28 from the rear nozzle 18.

Figure 6:
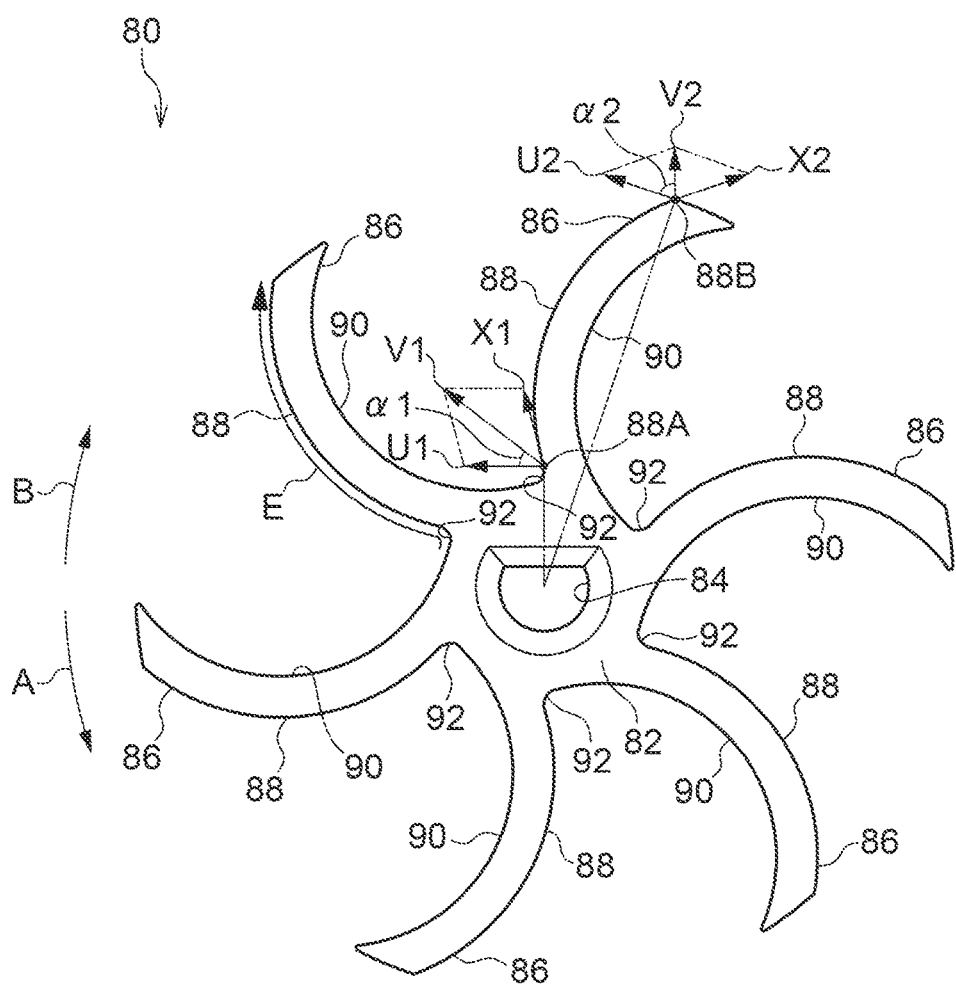
FIG. 6 is an explanatory diagram to explain flow of cleaning liquid when the impeller illustrated in FIG. 1 is being rotated towards a first side in a rotation direction.

In the impeller 80, the face on the first side in the rotation direction of the blade 86 is configured as the one side face 88. The one side face 88 is configured including the projecting face 89. The projecting face 89 is configured so as to project out from the base portion 88A towards the first side in the rotation direction with respect to the reference line L1 that passes through the base portion 88A and the rotation center C of the blade 86. Accordingly, as illustrated in FIG. 6, it is possible to make an angle (inflow angle) α1 small, the angle is formed between a blade rotation speed vector U1 (a circumferential direction speed vector of the base portion 88A of the blade 86) and an absolute speed vector V1 of the cleaning liquid. The blade rotation speed vector U1 arises at the base portion 88A side (inlet side) of the one side face 88 when the blade 86 is rotating towards the first side in the rotation direction (A direction). The absolute speed vector V1 is a compound vector of the blade rotation speed vector U1 and a relative speed vector X1 of the cleaning liquid in a flow direction (a tangential direction at the base portion 88A of the one side face 88) with respect to the blade 86. An angular momentum on the base side (inlet side) of the blades 86 is accordingly increased.

A load torque acting on the impeller 80 is a difference between the angular momentum on the leading end side (outlet side) and the angular momentum on the base portion 88A side of the blades 86 (inlet side). Accordingly, the load torque acting on the impeller 80 is reduced due to increasing the angular momentum on the base portion 88A side (inlet side) of the blades 86. As a result, a drop in the rotation speed of the blades 86 can be suppressed even when for example a viscosity of the cleaning liquid increases at low temperatures.

A discharge pressure of the impeller 80 is proportional to the square of the rotation speed of the blade 86. Accordingly, a drop in the discharge pressure of the impeller 80 can be suppressed due to suppressing a drop in a rotation speed of the blades 86 at low temperature environments. It is accordingly possible to suppress the landing point of the cleaning liquid from becoming lower when the cleaning liquid is discharged onto the front windshield 26 from the front nozzle 16, even when the viscosity of the cleaning liquid increases at low temperatures. In particular, the landing point of the cleaning liquid can be effectively suppressed from becoming lower when the vehicle 24 is travelling at high speed and 1 at low temperature environments.

As viewed along the rotation shaft 40 axial direction, the one side face 88 configured by a curved face of a single circular arc forms a projection towards the first side in the rotation direction (A direction). Namely, the leading end portion of the one side face 88 of the blade 86 is smoothly curved towards the second side in the rotation direction on progression towards outside in the boss 82 radial direction. It is accordingly possible to make an angle (outflow angle) α2 (see FIG. 6) to be large, the angle is formed between a blade rotation speed vector U2 (a circumferential direction speed vector of the leading end 88B of the blade 86) and an absolute speed vector V2 of the cleaning liquid. The blade rotation speed vector U2 arises at a leading end 88B side (outlet side) of the one side face 88 when the blade 86 is rotating towards the first side in the rotation direction (A direction). The absolute speed vector V2 is a compound vector of the blade rotation speed vector U2 and a relative speed vector X2 of the cleaning liquid in a flow direction (a tangential direction at the leading end 88B of the one side face 88) with respect to the blade 86). Angular momentum on the leading end side (outlet side) of the blades 86 is accordingly reduced. As described above, the load torque acting on the impeller 80 is the difference between the angular momentum on the leading end side (outlet side) of the blade 86 and that on the base end side (inlet side) of the blade 86, Accordingly, the load torque acting on the impeller 80 can be reduced even further. A drop in discharge pressure of the impeller 80 can accordingly be further suppressed, since a drop in the rotation speed of the blade 86 can be further suppressed even when the viscosity of the cleaning liquid increases at low temperatures.

Figure 7A:
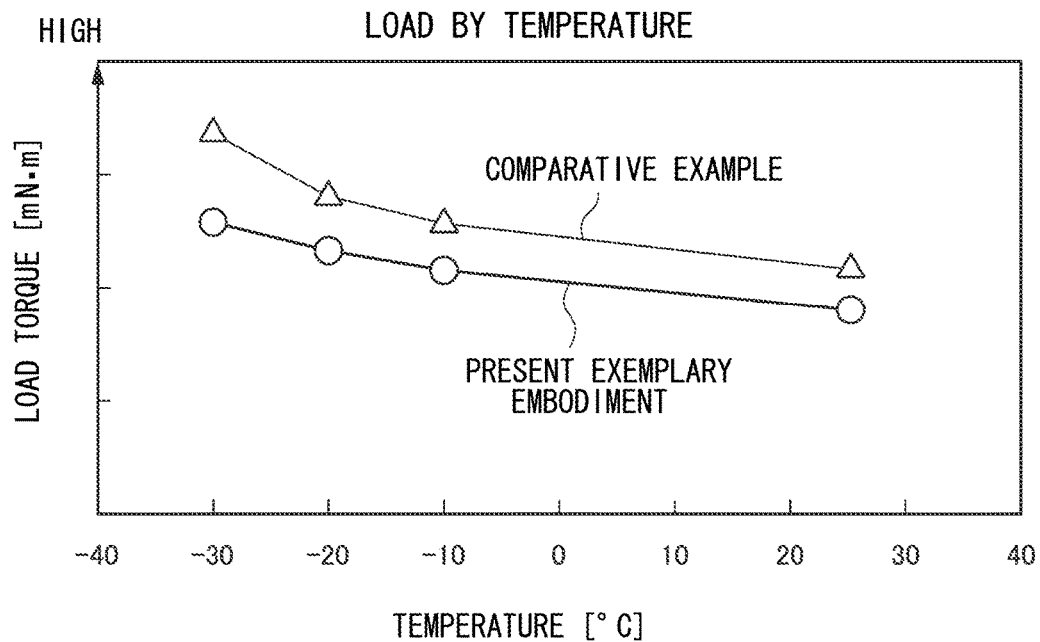
FIG. 7A is a graph to compare load torque between the impeller illustrated in FIG. 1 and an impeller of a Comparative Example.
Figure 7B:
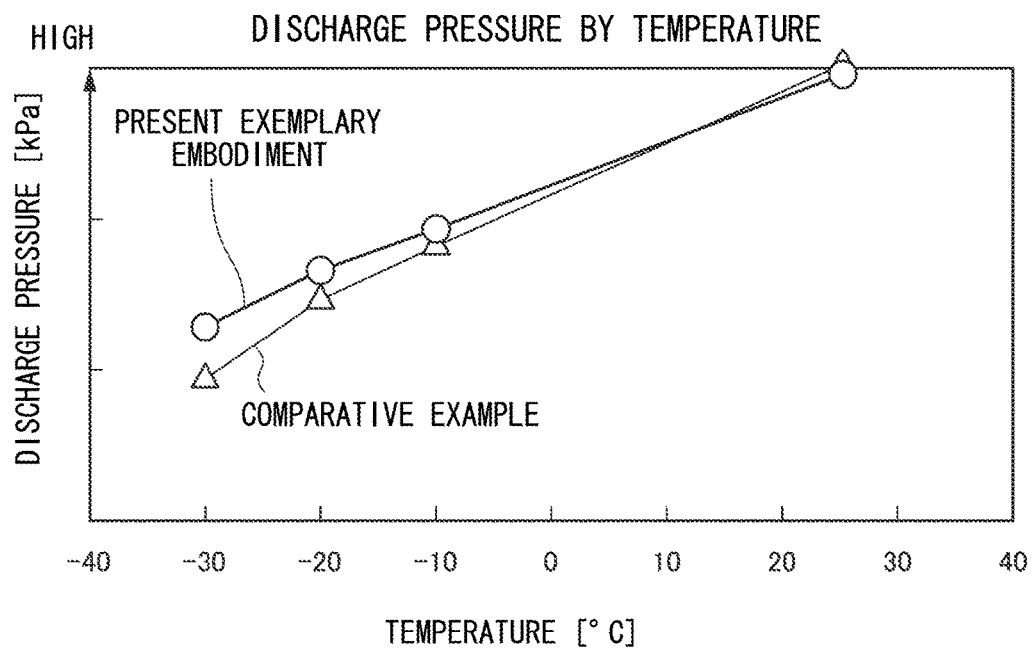
FIG. 7B is a graph to compare discharge pressure between the impeller illustrated in FIG. 1 and an impeller of a Comparative Example.

FIG. 7A and FIG. 7B illustrate data regarding the suppression of a drop in discharge pressure of the impeller 80 as described above, compared to an impeller of a Comparative Example. Note that blades of the impeller of the Comparative Example extend in straight lines towards the radial direction outside of a boss.

In the graph illustrated in FIG. 7A, the horizontal axis shows temperature (° C.) (atmospheric temperature), and the vertical axis shows load torque acting on the impeller (mN·m). The load torque acting on the impeller of the Comparative Example is indicated by the triangular marks, and the load torque acting on the impeller 80 of the present exemplary embodiment is indicated by the circular marks. As illustrated in FIG. 7A, it can be seen that the load torque acting on the impeller 80 of the present exemplary embodiment is lower than the load torque acting on the impeller of the Comparative Example at each temperature. A drop in the rotation speed of the blades 86 of the impeller 80 is accordingly suppressed more than in the impeller of the Comparative Example, even when the viscosity of the cleaning liquid increases at low temperature. The impeller 80 of the present exemplary embodiment moreover exhibits smaller variation in load torque with respect to temperature changes at low temperatures than the Comparative Example.

As a result, as illustrated in FIG. 7B, even when the viscosity of the cleaning liquid increases at low temperatures, the discharge pressure of the impeller 80 is higher than that of the impeller of the Comparative Example. In the graph illustrated in FIG. 7B, the horizontal axis shows temperature (° C.) (atmospheric temperature), and the vertical axis shows discharge pressure (kPa) of the impeller. The discharge pressure of the impeller of the Comparative Example is indicated by the triangular marks, and the discharge pressure of the impeller 80 of the present exemplary embodiment is indicated by the circular marks. As explained above, a drop in discharge pressure of the impeller 80 can be suppressed even when the viscosity of the cleaning liquid increases at low temperatures. The impeller 80 of the present exemplary embodiment moreover exhibits smaller change in discharge pressure with respect to temperature changes at low temperatures than the Comparative Example.

In the impeller 80 of the present exemplary embodiment, the leading end 88B is disposed further to the second rotation direction side (B direction) than the projecting face 89 of the one side face 88 with respect to the reference line L1. The difference between the angular momentum on the leading end 88B side (outlet side) and the angular momentum on the base portion 88A side (inlet side) of the blades 86 can accordingly be set even smaller, thereby further reducing the load torque acting on the impeller 80. As a result, a drop in the discharge pressure of the impeller 80 can be effectively suppressed even when the viscosity of the cleaning liquid increases at low temperatures.

Plural pairs of the blades 86 (one such pair configuring one group) are formed opposing each other across the rotation center C of the blades 86 (in the present exemplary embodiment there are three groups disposed at even angular intervals). Overall, the one side faces 88 bulge towards the first rotation direction side (A direction) with respect to the line L2 that joins together the leading ends 88B of the one side faces 88 of the pairs of the blades 86. The blades can accordingly be disposed with good balance in the impeller 80 whilst the blades have the one side faces 88 including the projecting faces 89 that project out towards the first rotation direction side (A direction) from the base portion 88A side. A good rotation balance can accordingly be achieved for the impeller 80.

The width dimension W2 of the outer peripheral face 94 at the leading end portion of the blades 86 is set larger than the width dimension W1 of the intermediate portion of the blades 86. When the blades 86 are rotating towards the first rotation direction side (A direction), a force directed from the outer peripheral faces 94 towards the first rotation direction side acts on the cleaning liquid available at the outside of the outer peripheral faces 94 of the blades 86 (see the regions D indicated by the double-dotted dashed line in FIG. 4) according to the viscosity of the cleaning liquid. The flow speed of the cleaning liquid at the outside of the outer peripheral faces 94 can accordingly be made faster than in a case in which the width dimension W2 of the blade 86 at the outer peripheral face 94 is set the same as the width dimension W1 at the intermediate portions of the blade 86. As a result, the flow speed of the cleaning liquid discharged out by the impeller 80 can be suppressed from dropping at low temperatures, and the cleaning liquid can be made to flow to the first outlet 60 side in a desired manner.

As described above, the one side face 88 is configured with a curved face of a single circular arc as viewed along the rotation shaft 40 axial direction. The one side face 88 accordingly extends from the base portion 88A to the leading end 88B with the same curvature. Accordingly, when the impeller 80 is rotated towards the first rotation direction side (A direction) and the cleaning liquid flows along the one side face 88 towards the radial direction outside of the boss 82, sudden profile changes in the one side face 88 with respect to the cleaning liquid are suppressed. The cleaning liquid can therefore be made to flow smoothly along the one side face 88.

As viewed from the rotation shaft 40 axial direction, the other side face 90 configuring the face in the second rotation direction side of the blade 86 is formed from a curved face of a single circular arc forming a concentric circle with the one side face 88. The width dimension W1 at the intermediate portions of the blade 86 can accordingly be kept uniform. When forming the impeller 80 for example by resin molding, deformation due to for example shrinking during curing can be prevented due to having a uniform thickness, thereby enabling good, precise molding.

The other side face 90 and the one side face 88 of adjacent blades 86 are connected by the connecting face 92 that is configured by a curved face at the boss 82. The cleaning liquid between the adjacent blades 86 can accordingly be made to flow smoothly along the one side face 88 towards the radial direction outside of the boss 82 when the impeller 80 is rotating towards the first rotation direction side (A direction). Namely, the cleaning liquid on the one side face 88 side between the blades 86 flows along the one side face 88 towards the radial direction outside of the boss 82 when the blades 86 are rotating towards the first rotation direction side (A direction) (see arrow E in FIG. 6). Since the other side face 90 and the one side face 88 of the adjacent blades 86 are connected together by the connecting face 92, the cleaning liquid near the boss 82 flows smoothly towards the base portion 88A side of the one side face 88 along the connecting face 92, and the cleaning liquid then flows smoothly along the one side face 88 towards the radial direction outside. The cleaning liquid between the blades 86 can accordingly be made to flow smoothly along the one side face 88 towards the radial direction outside.

The cross-section profile orthogonal to the rotation shaft 40 axial direction of the blades 86 are formed to be uniform along the rotation shaft 40 axial direction. Accordingly, the impeller 80 can be used with the front and back faces of the impeller 80 inverted according to the specification of the centrifugal pump (washer pump) 12 to which the impeller 80 is applied.

In the present exemplary embodiment, the first outlet 60 and the second outlet 62 are provided to the outer peripheral portion of the pump chamber 54, and the separation D1 between the inner peripheral wall 44A of the pump chamber 54 on the first outlet 60 side and the impeller 80 is set larger than the separation D2 between the inner peripheral wall 44B of the pump chamber 54 on the second outlet 62 side and the impeller 80. Accordingly, when the impeller 80 rotates towards the first rotation direction side (vortex direction, arrow A direction) of the volute 46, the pressure of the cleaning liquid between the inner peripheral wall 44A and the impeller 80 on the first outlet 60 side becomes greater than the pressure of the cleaning liquid between the inner peripheral wall 44B and the impeller 80 on the second outlet 62 side. When this occurs, the valve main body portion 182 of the valve device 70 makes contact with the leading end portion of the second inner extension cylinder portion 168B and the leading end portion of the second inner extension cylinder portion 168B is closed off by the valve main body portion 182. As a result, the cleaning liquid between the inner peripheral wall 44A and the impeller 80 on the first outlet 60 side is discharged from the first discharge opening 176A through the first inflow cylinder portion 166A, the first inner extension cylinder portion 168A, and the first discharge portion 72B of the valve device 70.

In the present exemplary embodiment, when the impeller 80 rotates towards the second rotation direction side (arrow B side) of the volute 46, the pressure of the cleaning liquid between the inner peripheral wall 44B of the pump chamber 54 and the impeller 80 on the second outlet 62 side becomes higher than the pressure of the cleaning liquid between the inner peripheral wall 44A and the impeller 80 on the first outlet 60 side. When this occurs, the valve main body portion 182 of the valve device 70 makes contact with the leading end portion of the first inner extension cylinder portion 168A and the leading end portion of the first inner extension cylinder portion 168A is closed off by the valve main body portion 182. As a result, the cleaning liquid between the inner peripheral wall 44B and the impeller 80 on the second outlet 62 side is discharged from the second discharge opening 176B through the second inflow cylinder portion 166B, the second inner extension cylinder portion 168B and the second discharge portion 74B of the valve device 70.

In the present exemplary embodiment, the impeller 80 includes the blades 86 wherein the leading ends 88B are disposed further to the second rotation direction side (arrow B side) than the base portions 88A. Therefore, as illustrated in FIG. 8A, the rotation load (indicated by the reference numeral F2) when the impeller 80 is rotated towards the second rotation direction side (arrow B direction) of the volute 46 becomes greater than the rotation load (indicated by the reference numeral F1) when the impeller 80 is rotated towards the first rotation direction side (vortex direction, arrow A direction) of the volute 46. In other words, the rotation speed when the impeller 80 is rotated towards the second rotation direction side (arrow B direction) is lower than the rotation speed when the impeller 80 is rotated towards the first rotation direction side (vortex direction, arrow A direction). As a result, as illustrated in FIG. 8B, despite using the same motor 38 and impeller 80, by simply switching the rotation direction, the discharge pressure (indicated by the reference numeral P2) of the cleaning liquid discharged from the second outlet 62 is made lower than the discharge pressure (indicated by the reference numeral P1) of the cleaning liquid discharged from the first outlet 60.

As described above, in the present exemplary embodiment, the first discharge portion 72B of the centrifugal pump 12 is connected to a supply tube in communication with the front nozzle 16 provided on the vehicle front windshield side, and the second discharge portion 74B is connected to a supply tube in communication with the rear nozzle 18 provided on the vehicle rear windshield side. Accordingly, employing the single motor 38 and impeller 80, the pressure of the cleaning liquid fed from the pump chamber 54 to the front windshield side can be made high, and the pressure of the cleaning liquid fed from the pump chamber 54 to the rear windshield side can be made low. As a result, cleaning liquid can be squirted at high pressure onto the front windshield that is susceptible to the effects of airflow accompanying vehicle travel, whilst cleaning liquid can be squirted at low pressure onto the rear windshield that is less susceptible to the effects of airflow. Moreover, the supply tube provided between the centrifugal pump 12 and the squirt nozzle provided on the rear windshield side can be prevented from coming off, since the pressure of the cleaning liquid pressure fed to the rear windshield side is kept low.

Moreover, as illustrated in FIG. 4, in the present exemplary embodiment, the first outlet 60 and the second outlet 62 are formed so as to extend towards the radial direction outsides of the impeller 80 and the pump chamber 54, and the first outlet 60 and the second outlet 62 are also disposed side-by-side and adjacent to each other as viewed along the axial direction of the rotation shaft 40 of the motor 38. Accordingly, a large angle range in the circumferential direction can be set for the volute 46 provided inside the pump chamber 54. As a result, the pressure difference between the liquid discharged from the first discharge portion 72B and the liquid discharged from the second discharge portion 74B can be made even larger. Moreover, the first inflow cylinder portion 166A and the second inflow cylinder portion 166B of the valve device 70 can be connected to the first outlet 60 and the second outlet 62 at the same time.

In the present exemplary embodiment, the separation D3 between the location 44C of the inner peripheral wall of the pump chamber 54 between the first outlet 60 and the second outlet 62 and the impeller 80 is set narrower than the separation D2 between the inner peripheral wall 44B and the impeller 80 on the second outlet 62 side. The cleaning liquid can accordingly be suppressed from flowing from the first outlet 60 side to the second outlet 62 side by passing between the location 44C of the pump chamber 54 and the impeller 80. As a result, a drop in pressure of the cleaning liquid on the first outlet 60 side can be suppressed. Moreover, the pressure of the cleaning liquid on the first outlet 60 side and on the second outlet 62 side is a positive pressure whether the impeller 80 is rotated towards the first rotation direction side (vortex direction, arrow A direction) or towards the second rotation direction side (opposite direction to the vortex direction, arrow B direction). However, suppressing the cleaning liquid from flowing from the first outlet 60 side to the second outlet 62 side as described above, and suppressing the cleaning liquid from flowing from the second outlet 62 side to the first outlet 60 side enables a large pressure difference to be achieved between the cleaning liquid on the first outlet 60 side and the second outlet 62 side, thereby enabling speedy switching response characteristics to be obtained for the valve device 70.

Note that in the present exemplary embodiment, explanation has been given regarding a preferable example in which the separation D3 between the location 44C of the inner peripheral wall of the pump chamber 54 and the impeller 80 is set narrower than the separation D2 between the inner peripheral wall 44B and the impeller 80 on the second outlet 62 side, however the present invention is not limited thereto. These separations may be set as appropriate in consideration of factors such as balancing the pressure of the cleaning liquid on the first outlet 60 side and on the second outlet 62 side.

In the present exemplary embodiment, explanation has been given of a preferable example wherein the first outlet 60 and the second outlet 62 are formed so as to extend towards radial direction outsides of the impeller 80 and the pump chamber 54, and the first outlet 60 and the second outlet 62 are disposed side-by-side and adjacent to each other as viewed along the axial direction of the rotation shaft 40 of the motor 38, however the present invention is not limited thereto. The locations of the pump body 30 to which the first outlet 60 and the second outlet 62 are provided may be set as appropriate according to the valve device employed.

In the present exemplary embodiment, the inlet 50 of the centrifugal pump 12 is inserted into an opening of a storage tank through for example a grommet, however the present invention is not limited thereto. The present invention may also be applied to what is referred to as an in-tank type washer pump wherein the majority of the pump body is inserted inside the storage tank, with the pump chamber disposed inside the storage tank.

In the present exemplary embodiment, the one side face 88 is formed as a single circular arc as viewed along the rotation shaft 40 axial direction, however the profile of the one side face 88 is not limited thereto. For example, the one side face 88 may have curved faces configured by two or more circular arcs as viewed along the rotation shaft 40 axial direction. Namely, the one side face 88 may be configured by a curved face that forms a projection towards the first rotation direction side (A direction) of the blade 86 as viewed along the rotation shaft 40 axial direction. For example, configuration may be made wherein the one side face 88 is configured by three curved faces of plural circular arcs that respectively form a projection towards the first rotation direction side of the blade 86. Specifically, a projecting face 89 is formed with a circular arc of small radius so as to reduce the size of the inflow angle $\alpha 1$ on the base portion 88A side (inlet side), and projecting faces with circular arcs of larger radius are formed further towards the leading end 88B side (outlet side) of the blade 86 to set a large size for the outflow angle $\alpha 2$.

In the present exemplary embodiment, the other side face 90 is formed with a concave shaped curved face of a single circular arc as viewed along the rotation shaft 40 axial direction, however the profile of the other side face 90 is not limited thereto. For example, the other side face 90 may be configured with concave shaped curved faces configured by two or more circular arcs as viewed along the rotation shaft 40 axial direction.

The leading end 88B of the one side face 88 is disposed on the second rotation direction side with respect to the reference line L1 that passes through the base portion 88A of and the rotation center C of the blade 86. However, the leading end 88B of the one side face 88 may alternatively be disposed on the first rotation direction side with respect to the reference line L1. In such cases, the whole of the one side face 88 configures the projecting face 89.

The width dimension W2 of the outer peripheral face 94 of the blade 86 is set larger than the width dimension W1 of intermediate portions in the blade extension direction. However, alternatively configuration may be made wherein the width dimension W2 of the outer peripheral face 94 of the blade 86 is set so as to be substantially the same as the width dimension W1 of intermediate portions.

In the present exemplary embodiment, the impeller 80 is configured with six of the blades 86, however the number of the blades 86 on the impeller 80 is not limited thereto. For example, configuration may be made with three of the blades 86 on the impeller 80, with the blades 86 disposed at equal separations around the impeller 80 rotation direction.

In the present exemplary embodiment, the centrifugal pump 12 is configured including the first outlet 60 and the second outlet 62. Namely, the centrifugal pump 12 is what is referred to as a double outlet pump that discharges cleaning liquid from either the first outlet 60 or the second outlet 62 by switching the rotation of the motor 38, thereby switching the rotation direction of the impeller 80. Alternatively, the centrifugal pump 12 may be configured by what is referred to as a single outlet pump in which the second outlet 62 of the centrifugal pump 12 is omitted, and the impeller 80 is configured so as to rotate only towards the first rotation direction side (A direction). In such a configuration, the valve device 70 may be omitted, with the hose 20 directly connected to the first outlet 60.

In the present exemplary embodiment, the impeller 80 is applied to the centrifugal pump 12 of the vehicle washer device 10, however the impeller 80 may be applied to a centrifugal pump of a headlamp cleaner of the vehicle 24.

What is claimed is:

1. An impeller for a centrifugal pump comprising:
   a boss that is supported by a rotation shaft of a motor so as to be rotatable as a unit with the rotation shaft; and
   a plurality of blades that extend from the boss towards a radial direction outside of the boss, and that discharge liquid towards a leading end side thereof by rotating,
   wherein, in plan view of the impeller, one of a clockwise direction and a counter-clockwise direction in a rotational direction of the impeller is a first direction and the other one of the clockwise direction and the counter-clockwise direction in the rotational direction of the impeller is a second direction, each of the blades comprises a first side face that is disposed on a first direction side and the first side face includes a projecting portion that projects from a base end portion at a boss side of the first side face towards the first direction side, and a line, connecting the base end portion and a center of rotation of the impeller and extending further radially outward toward an outer circumference of the impeller, intersects the first side face such that the projecting portion is defined between the line and the first side face;
   a second side face of each of the blades is disposed on a second direction side;
   for adjacent blades, the first side face of one of the adjacent blades and the second side face of the other of the adjacent blades are connected together at the boss by a connecting face
   having a convex shape that projects toward the second direction side.

2. The impeller of claim 1, wherein the first side face of each blade is configured as a curved face that forms a projection towards the first direction side, as viewed along an impeller rotation axis direction.

3. The impeller of claim 1, wherein a leading end side of the first side face of each blade is disposed further towards a second direction side than the projecting portion with respect to the line that connects the base end portion and the center of rotation of the impeller and extends further radially outward toward the outer circumference of the impeller.

4. The impeller of claim 1, wherein:
a plurality of pairs of the blades are formed opposing each other across the center of rotation of the impeller; and
the first side face of each blade bulges towards the first direction side with respect to a line that joins together leading ends of the first side face of each blade of each of the pair of blades.

5. The impeller of claim 1, wherein a width dimension of an outer peripheral face at a leading end portion of each blade is set larger than a width dimension of an intermediate portion between the base end portion at the boss side and the leading end portion of each blade in an extension direction toward a radially outer side of the blade.

6. The impeller of claim 1, wherein the first side face of each blade is configured as a curved face of a singular circular arc as viewed along an impeller rotation axis direction.

7. The impeller of claim 6, wherein the second side face that is disposed on a second direction side is configured as a curved face of a single circular arc that forms a concentric circle with the first side face of each blade as viewed along the impeller rotation axis direction.

8. The impeller of claim 1, wherein a cross-section profile of each of the blades orthogonal to an impeller rotation axis is formed so as to be constant at each of the blades along a direction of the impeller rotation axis.

9. A centrifugal pump of a vehicle washer device, the pump comprising:
a motor housed in a motor housing portion of a pump body; and
the impeller for a centrifugal pump of claim 1,
wherein the impeller is housed in a pump chamber of the pump body and is supported on the rotation shaft, the pump chamber in communication with an inside of a water tank and the impeller and the rotation shaft are rotatable as a unit, and
wherein the impeller discharges liquid inside the water tank towards an outlet of the pump body.

10. The centrifugal pump of claim 9, wherein:
the outlet includes a first outlet connected to a front nozzle for a vehicle front windshield and a second outlet connected to a rear nozzle for a vehicle rear windshield; and
the liquid is discharged to a first outlet side by rotating the impeller towards the first direction.

11. The centrifugal pump of claim 9,
wherein the impeller is configured such that, during rotation of the blades towards the first direction, an angle formed between a blade rotation speed vector (U1) arising at the base end portion of the first side face of each blade and a relative speed vector (Wi) of a cleaning liquid in a tangential direction arising at the base end portion is an acute angle.

12. The centrifugal pump of claim 9, wherein the liquid flows through a communication hole formed at a pump chamber central portion and towards an outer peripheral portion of the impeller, wherein the communication hole is concentric with the rotation center of the impeller.

13. The centrifugal pump of claim 12, wherein an outer periphery of the boss of the impeller has a smaller diameter than a diameter of the communication hole.

14. The centrifugal pump of claim 12, wherein the base end portion of each blade is positioned at a radial location closer to the rotation shaft than a periphery of the communication hole.

15. The centrifugal pump of claim 10, further comprising:
a valve that discharges liquid from either a first discharge portion or a second discharge portion based on a pressure difference between liquid introduced through a first inlet and a second inlet that are respectively connected to the first outlet and the second outlet,
wherein the pump chamber comprises a volute chamber in which a separation between an inner peripheral wall of the pump chamber and the impeller on a first outlet side is wider than a separation between an inner peripheral wall of the pump chamber and the impeller on a second outlet side.

16. The centrifugal pump of claim 15, wherein:
the first outlet and the second outlet extend towards a radial direction outside of the pump chamber, and the first outlet and the second outlet are disposed side-by-side and adjacent to each other as viewed along the motor axial direction.

17. The centrifugal pump of claim 15, wherein:
a separation between a location of an inner peripheral wall of the pump chamber between the first outlet and the second outlet and the impeller is narrower than the separation between the inner peripheral wall of the pump chamber and the impeller on the second outlet side.

* * * * *